(12) United States Patent
Guzik et al.

(10) Patent No.: US 11,818,507 B2
(45) Date of Patent: Nov. 14, 2023

(54) AUTOMATED CORRELATION OF MEDIA DATA TO EVENTS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/328,283

(22) Filed: May 24, 2021

(65) Prior Publication Data

US 2022/0377282 A1 Nov. 24, 2022

(51) Int. Cl.
G08B 25/01 (2006.01)
G11B 27/34 (2006.01)
H04N 7/18 (2006.01)

(52) U.S. Cl.
CPC ............ H04N 7/181 (2013.01); G08B 25/01 (2013.01); G11B 27/34 (2013.01)

(58) Field of Classification Search
CPC ......... H04N 7/181; G08B 25/01; G11B 27/34
See application file for complete search history.

(56) References Cited

U.S. PATENT DOCUMENTS

2016/0247541 A1* 8/2016 Hundemer ........... H04N 5/2222
2017/0295477 A1* 10/2017 Clawson .............. H04M 3/5116
2019/0236365 A1* 8/2019 Speasl .................... G06V 20/13
2020/0019717 A1* 1/2020 Steffey .................. H04L 9/3239
2021/0312351 A1* 10/2021 Pourmohammad .......................... G06Q 10/0635

FOREIGN PATENT DOCUMENTS

EP 3598764 A1 * 1/2020 ......... G06F 3/04842
WO WO-2019046139 A1 * 3/2019 .......... G06Q 20/065

OTHER PUBLICATIONS

Canadian Patent Application No. 3,158,662, Office Action dated 10 Jul. 2023, 4 pages.

* cited by examiner

*Primary Examiner* — Thai Q Tran
*Assistant Examiner* — Jose M Mesa
(74) *Attorney, Agent, or Firm* — Han Santos, PLLC (57) ABSTRACT

Described herein are techniques that may be used to automatically correlate a portion of a media data to an event. Such techniques may comprise receiving, from one or more data sources, at least one media data associated with a first time and a first location. The techniques may further comprise receiving an indication of an event associated with a second time and a second location and determining whether a geographic proximity between the first location and the second location is within a threshold distance. Upon determining the geographic proximity is within the threshold distance, the techniques may further comprise determining a portion of the at least one media data for which a temporal proximity is within a threshold timeframe, and upon determining the temporal proximity is within the threshold timeframe, creating a correlation between the at least one media data and the event.

17 Claims, 7 Drawing Sheets

AUTOMATED CORRELATION OF MEDIA DATA TO EVENTS

BACKGROUND

In recent years, a number of events have highlighted the need for increased recordkeeping for law enforcement officers. This need pertains to both evidentiary collection as well as protecting the public from potential abuses by a police officer and protecting the police officer from false accusations of abuse. Law enforcement has previously used various camera devices, such as patrol vehicle cameras and body mounted cameras, as a means of reducing liability and documenting evidence.

The Freedom of Information Act is a federal law that allows users to request information from any government agency. Analogous laws have been implemented in some states. When a FOIA request is received by a police agency, such a request may require all information related to a particular event. This can result in a substantial burden being placed on the police agency to identify each of the relevant files from a number of different types of data. Failure to properly comply with the request can result in heavy fines being levied against the police agency.

SUMMARY

Techniques are provided herein for automatically correlating a portion of a media data to an event based on one or more detected correlating factors such as geographic proximity, temporal proximity, object recognition and matching identifiers including names and aliases. In such techniques, an event is generated to be associated with an incident (e.g., a request for emergency services). In some embodiments, an event may be associated with multiple incidents. Media content may be received from a number of data sources that comprises audio, video, and/or imagery. The techniques may comprise determining a relevance of the media data to the event by determining whether a geographical proximity (e.g., a physical distance between the media data and the event) and temporal proximity (e.g., an amount of time that elapsed between the media data and the event) of the media data to the event are below a predetermined threshold. If both the geographical proximity and temporal proximity are below the predetermined thresholds, then the system may store a correlation between the media data and event. In some embodiments, a portion of the media data may be correlated to the event.

In one embodiment, a method is disclosed as being performed by a request processing platform, the method comprising receiving, from one or more data sources, at least one media data associated with a first time and a first location, receiving an indication of an event, the event associated with a second time and a second location, determining whether a geographic proximity between the first location and the second location is within a threshold distance, upon determining the geographic proximity is within the threshold distance, determining a portion of the at least one media data for which a temporal proximity is within a threshold timeframe, and upon determining the temporal proximity is within the threshold timeframe, creating a correlation between the at least one media data and the event.

An embodiment is directed to a computing device comprising: a processor; and a memory including instructions that, when executed with the processor, cause the computing device to receive, from one or more data sources, at least one media data associated with a first time and a first location, receive an indication of an event, the event associated with a second time and a second location, determine whether a geographic proximity between the first location and the second location is within a threshold distance, upon determining the geographic proximity is within the threshold distance, determine a portion of the at least one media data for which a temporal proximity is within a threshold timeframe, and upon determining the temporal proximity is within the threshold timeframe, create a correlation between the at least one media data and the event.

An embodiment is directed to a non-transitory computer-readable media collectively storing computer-executable instructions that upon execution cause one or more computing devices to perform acts comprising receiving, from one or more data sources, at least one media data associated with a first time and a first location, receiving an indication of an event, the event associated with a second time and a second location, determining whether a geographic proximity between the first location and the second location is within a threshold distance, upon determining the geographic proximity is within the threshold distance, determining a portion of the at least one media data for which a temporal proximity is within a threshold timeframe, and upon determining the temporal proximity is within the threshold timeframe, creating a correlation between the at least one media data and the event.

Embodiments of the disclosure provide several advantages over conventional techniques. For example, embodiments of the proposed system provide for automatically correlating media data received from a data source to an event based on a geographical and temporal proximity between the media data and the event. The system allows for the quick identification of media content relevant to an event without requiring excessive review by a user. This, in turn, frees up valuable resources that would otherwise be spent on a time-consuming process of manually identifying relevant media data.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to automatically correlate a portion of a media data to an event based on geographic proximity, temporal proximity, object recognition, matching identifiers, or other suitable factors. In some embodiments, such techniques may comprise determining whether a geographic and temporal proximity between a media data and the event are below predetermined thresholds. In some embodiments, media data is received from one or more data sources that comprise electronic devices capable of capturing media content. An event may be generated in association with an incident. In some embodiments, an event is generated by a computer-aided dispatch (CAD) system upon receiving a call requesting emergency services.

Each event and media data obtained by the system may be associated with a time (or range of times) and/or a geographic location. In some embodiments, the geographic location of each media data may be compared to the geographic location of the event in order to determine a geographic proximity of the media data to the event. Additionally, a time or range of times associated with the media data may be compared to a time or range of times associated with the event to determine a temporal proximity of the media data to the event. Once a geographical and temporal proximity of the media data and the event is determined, that geographical and temporal proximity is then compared to a predetermined threshold to determine a relevance of the media content to the event.

Figure 1:
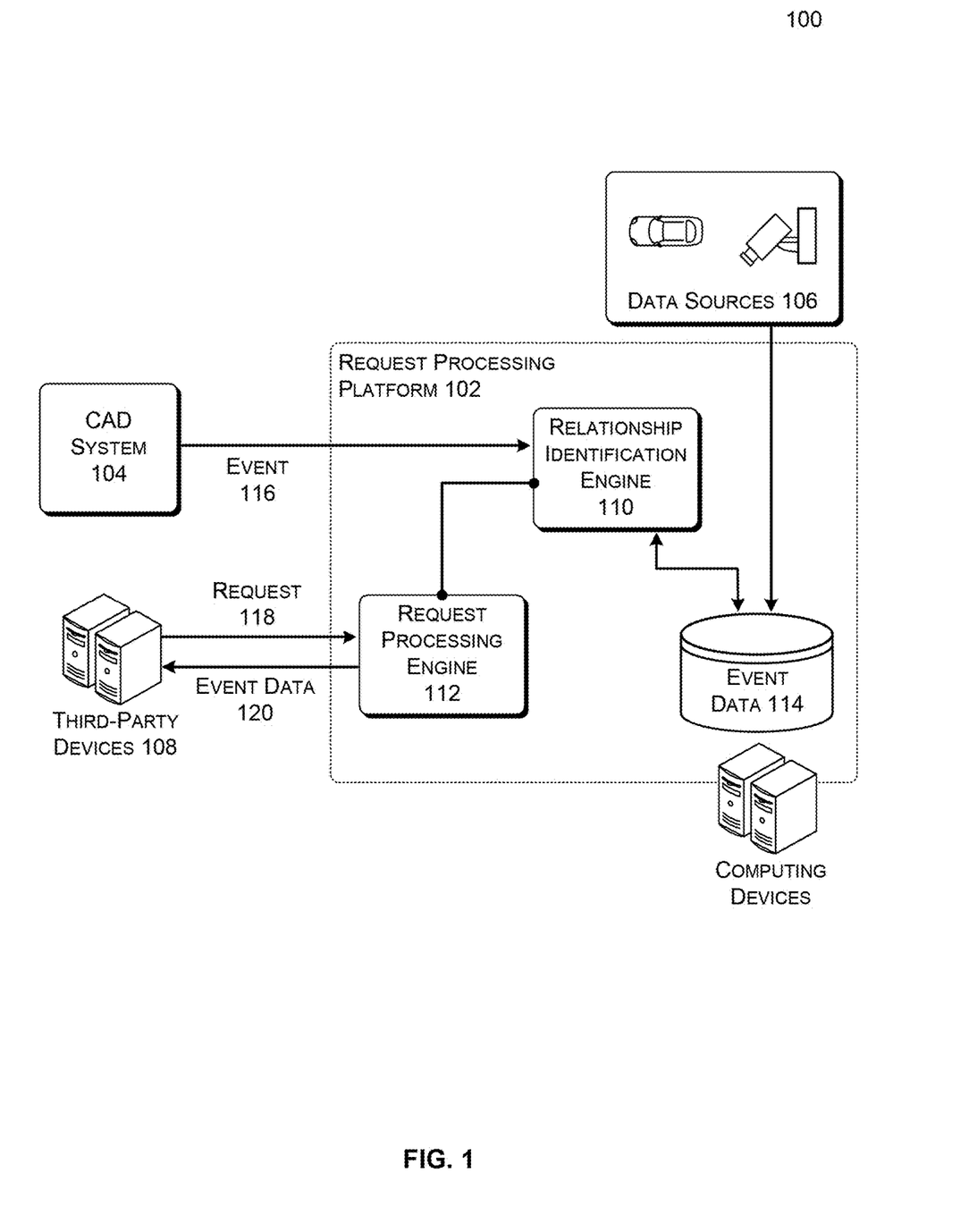
FIG. 1 illustrates an example computing environment configured to generate events and correlate data (e.g., media data) with generated events based on proximity in time and/or location in accordance with at least some embodiments.

FIG. 1 illustrates a computing environment configured to generate events and correlate data (e.g., media data) with generated events based on proximity in time and/or location in accordance with at least some embodiments. In the computing environment depicted in FIG. 1, a request processing platform 102 is depicted in communication with a number of electronic device components, such as a computer-aided dispatch (CAD) system 104, one or more independent data sources 106, and one or more third-party devices 108.

The request processing platform 102 can include any computing device configured to perform at least a portion of the operations described herein. Request processing platform 102 may be composed of one or more general purpose computers, specialized server computers (including, by way of example, PC (personal computer) servers, UNIX™ servers, mid-range servers, mainframe computers, rack-mounted servers, etc.), server farms, server clusters, or any other appropriate arrangement and/or combination. Service provider computer 108 can include one or more virtual machines running virtual operating systems, or other computing architectures involving virtualization such as one or more flexible pools of logical storage devices that can be virtualized to maintain virtual storage devices for the computer.

The request processing platform 102 may maintain a number of components, including a relationship identification engine 110 capable of correlating various data to one or more events as well as a request processing engine 112 capable of receiving and responding to requests for event data. In some embodiments, the relationship identification engine 110 may maintain access to a database of information related to one or more events (e.g., event data 114).

The request processing platform may be in communication with a CAD system 104. Such a CAD system may be any suitable device capable of generating events for the request processing platform. In some embodiments, the CAD system may be a computing device configured to generate events from received phone calls. For example, the CAD system may be tied into a telephonic call system such that the CAD system is capable of obtaining and recording information about calls received by a dispatch operator using the CAD system. When a call is received by the CAD system, an event may be generated in association with that call. In some cases, the event may be generated by a dispatch operator of the CAD system upon taking a call. For example, a CAD system may be configured to be operated by an emergency services dispatcher that receives calls from users requiring emergency services. In this example, a separate event may be generated for each call that is received by the dispatcher. In some embodiments, the CAD system may be configured to automatically generate events 116 upon receiving a request to do so. For example, a police officer may request that an event be generated in relation to an incident that has occurred or is occurring.

A data source 106 may comprise any suitable electronic device capable of being used to record information about a person and/or vehicle's surroundings. In some cases, the recording device may be a camera mounted within a vehicle. In some cases, the recording device may be a device that is capable of being worn or otherwise mounted or fastened to a person. The data source 106 may include at least one input device, such as a microphone or camera, and a number of sensors capable of obtaining data about an environment in which the recording device is located. In some examples, such data sources may include wearable recording devices, vehicle-mounted recording devices, private security network devices, public network cameras, or any other suitable data collection device. Each of the data sources 106 may be configured to collect a variety of media information, such as images, audio, and/or video. In some embodiments, one or more of the data sources may be operated by an entity unaffiliated with the request processing platform 102. In some embodiments, the the data sources may have a number of sensors that include a temperature sensor, a real-time clock (RTC), an inertial measurement unit (IMU), or any other suitable sensor. An IMU may be any electronic device that measures and reports a body's specific force, angular rate, and sometimes the orientation of the body, using a combination of accelerometers, gyroscopes, and magnetometers.

In some embodiments, the computing environment may be in communication with one or more third-party computing devices 108. A third-party computing device may be a computing device operated on behalf of an entity unaffiliated with the request processing platform. In some embodiments, the third-party computing device may submit a request 118 to the processing platform for information related to a particular event or events. In some embodiments, such a request may be a request that complies with a law or legal requirement granting information access rights (e.g., the Freedom of Information Act). Upon receiving a request from a third-party computing device for information related to such an event, the request processing platform may identify any relevant event data 120 and provide the third-party device with access to that that event data.

For purposes of illustrating interactions between one or more of the components of the computing environment, consider an example in which data is correlated to an event and then provided to a third-party device in response to a request for that data. Consider, for this example, that a person places a call to emergency services in order to obtain assistance with an emergency. A CAD system that has access to the emergency services phone system creates a new event to be associated with the call and a police officer (or other emergency personnel) is dispatched to the location of the emergency.

Continuing with the above example, a request processing platform may receive an indication of the event created by the CAD system for the emergency as well as data (e.g., media data) from a number of data sources. Some of the data sources may provide a continuous stream of data (e.g., streaming video) or periodic still images regardless of the occurrence of any event. For example, security cameras connected to a private or public security infrastructure may continuously capture video imagery in a location. In another example, a camera positioned in a public place may be configured to capture still images every 30 seconds and to provide those still images to the request processing platform. Other data sources may provide media data for a specific period of time (e.g., the duration of the event). For example, a police officer dispatched to the location of the emergency may be wearing a body-mounted camera device that is in communication with the request processing platform. In another example, a camera or other recording device installed in the police officer's vehicle may collect and transmit information to the request processing platform. Each of the received source data may correspond to a location at which the source data was collected as well as a time or range of times during which the source data was collected.

In this example, the request processing platform may be configured to (e.g., via the relationship identification engine) identify data within the received source data that may be correlated to the created event. In some cases, this may be done by comparing a time/range of times associated with the event to a time/range of times associated with each of the source data to identify source data that was collected within some predetermined proximity in time of the event. In some cases, this may be done by comparing a location or locations associated with the event to a location or locations from which each of the source data was collected to identify source data that was collected within some predetermined proximity in geographic distance of the event. In some cases, a source data, or at least a portion of a source data, may be correlated to the event if that source data was collected within some proximity of both geographic distance and time of the event.

At some point in time subsequent to the event in the above example, the request processing platform may receive a request from a third-party device for information related to that event. For example, the request processing platform may receive a request from a prosecutors' office or a defense attorney. Upon receiving such a request, the processing platform identifies all of the source data correlated to the event and provides the requesting party with access to that data. In some embodiments, this may comprise sending the data itself to the requesting entity in response to the request. In some embodiments, this may comprise providing the requesting party with a link or other reference to a location at which the correlated data is stored.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
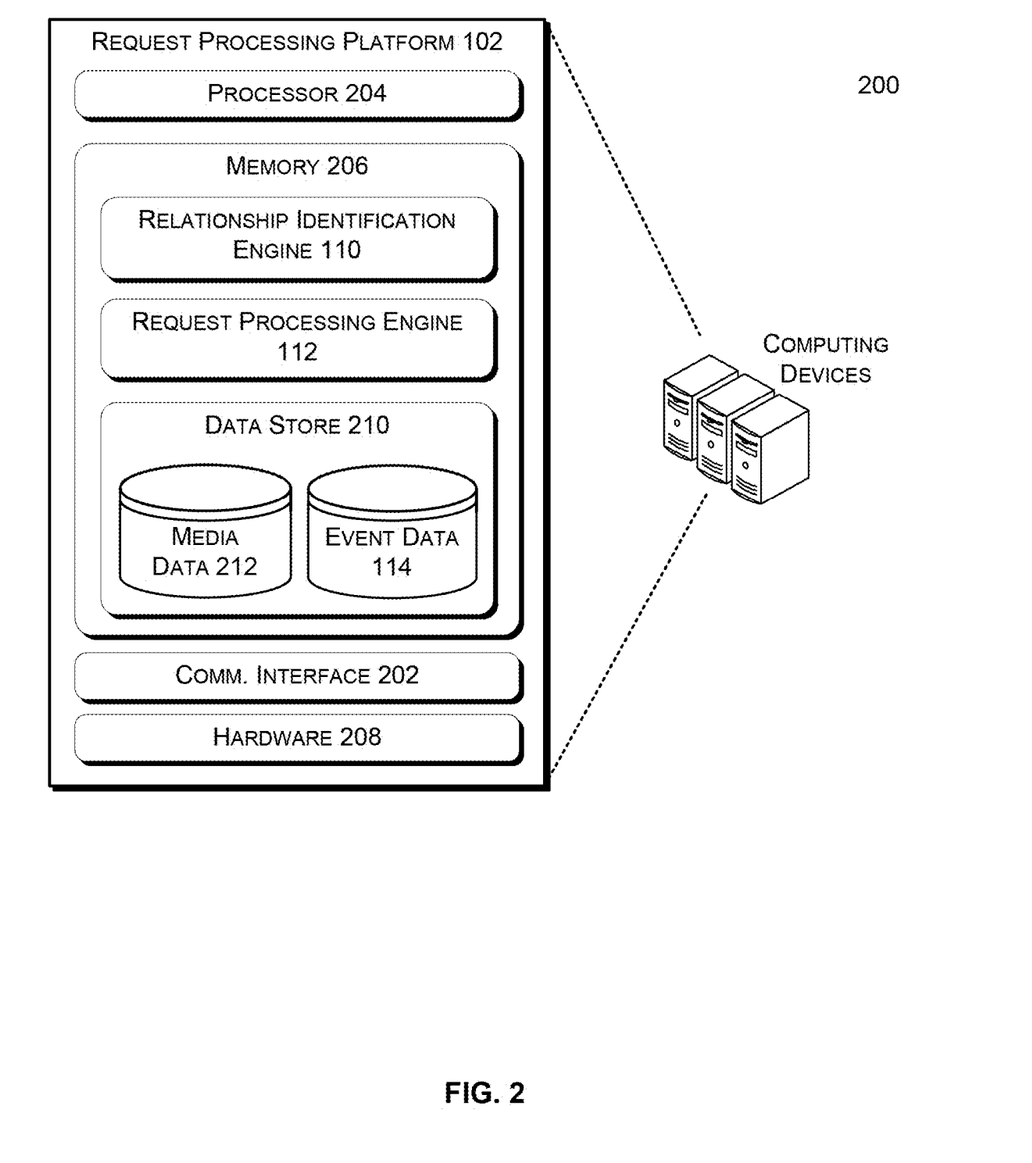
FIG. 2 is a block diagram showing various components of an example computing system architecture that supports correlation of source data to events based on temporal and geographic proximity in accordance with some embodiments.

FIG. 2 is a block diagram showing various components of a computing system architecture that supports correlation of source data to events based on temporal and geographic proximity in accordance with some embodiments. The system architecture 200 may include a request processing platform 102 that comprises one or more computing devices. The request processing platform 102 may include a communication interface 202, one or more processors 204, memory 206, and hardware 208. The communication interface 202 may include wireless and/or wired communication components that enable the request processing platform 102 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The request processing platform 102 can include any computing device or combination of computing devices configured to perform at least a portion of the operations described herein. The request processing platform 102 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The request processing platform 102 can include one or more virtual machines running virtual operating systems, or other computing architectures involving virtualization such as one or more flexible pools of logical storage devices that can be virtualized to maintain virtual storage devices for the computer. For example, the request processing platform 102 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the request processing platform 102 may implement functionality from one or more software modules and data stores. Such software modules may include routines, program instructions, objects, and/or data structures that are executed by the processors 204 to perform particular tasks or implement particular data types. The memory 206 may include at least a module for identifying correlations between media data and events (e.g., relationship identification engine 110) as well as a module for receiving and responding to requests (e.g., request processing engine 112). Additionally, the memory 206 may further include a data store 210 that contains a number of database tables or other data storage schemas. The data store 210 may include at least a database of media data received from various data sources (media data 212). In some cases, the data store 212 may further include a database of event data 114 received from one or more CAD systems.

The relationship identification engine 110 may be configured to, in conjunction with the processor 204, identify correlations between data received from one or more data sources and one or more events. In some embodiments, events may be created by a CAD system in communication with the request processing platform upon receiving a call from a person requiring emergency services. Information pertaining to such events may be stored in event data 114. The information stored in relation to each event may include an indication of one or more locations associated with the event (e.g., where an emergency occurred) as well as a timeframe during which the event occurred. Additionally, the request processing platform may maintain a data store of media data received from one or more data sources. Such media data may comprise at least audio, video, or still images captured via an electronic device. The media data may be associated with a particular location at which the media data was captured as well as a timeframe during which the media data was captured.

Upon determining that a new event has been generated, the relationship identification engine 110 may identify media content to be correlated to that event based on one or more factors, such as temporal or geographic proximity, object recognition, or identity matching. To do this, the relationship identification engine 110 may identify a set of media data originating from data sources as being associated with one or more factors. Such factors may comprise a determination as to whether the media data was collected within a predetermined geographic distance of the location associated with the event (e.g., using one or more geofencing techniques). Such factors may otherwise include a determination that one or more objects identified within the media data match or otherwise correspond to objects associated with an event.

Additionally, the relationship identification engine 110 may identify, from that set of media data, a subset of media data that was captured within a predetermined amount of time from (either before or after) the occurrence of the event. In some embodiments, this may be a portion of the media content. For example, if a video file is determined to have been captured within a geographic proximity of a location associated with the event, then a portion of that video file that corresponds to a specified timeframe may be correlated to the event. In this example, the specified timeframe may include a range of time that begins a predetermined amount of time before the occurrence of the event and ends a predetermined amount of time after the event is recorded to have ended. In some embodiments, the relationship identification engine may correlate events based on persons or resources involved in the event. For example, if an officer is dispatched in relation to an event, then video captured from a vehicle assigned to that officer during a timeframe in which the event occurred may be correlated to the event automatically. In some embodiments, events may be correlated to other events. In some embodiments, the relationship identification engine may store an indication of any identified correlated media data in event data 114.

The request processing engine 112 may be configured to, in conjunction with the processor 204, respond to a request received from a third-party computing device. In some embodiments, the request processing engine may retrieve media data determined to be correlated to the event based on an indication stored in the event data. In some cases, the request processing engine may be configured to perform additional processing on the media data. For example, before responding to a request for media data related to a particular event, the request processing engine may be configured to blur images of innocent (or at least non-relevant) parties within a video file. In some embodiments, the request processing engine may provide a data file to the requesting entity that includes a separate copy of any correlated media data. In other embodiments, the request processing engine may provide the requesting entity with a link (or other suitable location reference) that the requesting entity can use to access the correlated media data.

The communication interface 202 may include wireless and/or wired communication components that enable the request processing platform to transmit or receive data via a network, such as the Internet, to a number of other electronic devices (e.g., data source 106). Such a communication interface 202 may include access to both wired and wireless communication mechanisms. In some cases, the request processing platform transmits data to other electronic devices over a long-range communication channel, such as a data communication channel that uses a mobile communications standard (e.g., long-term evolution (LTE)).

Figure 3:
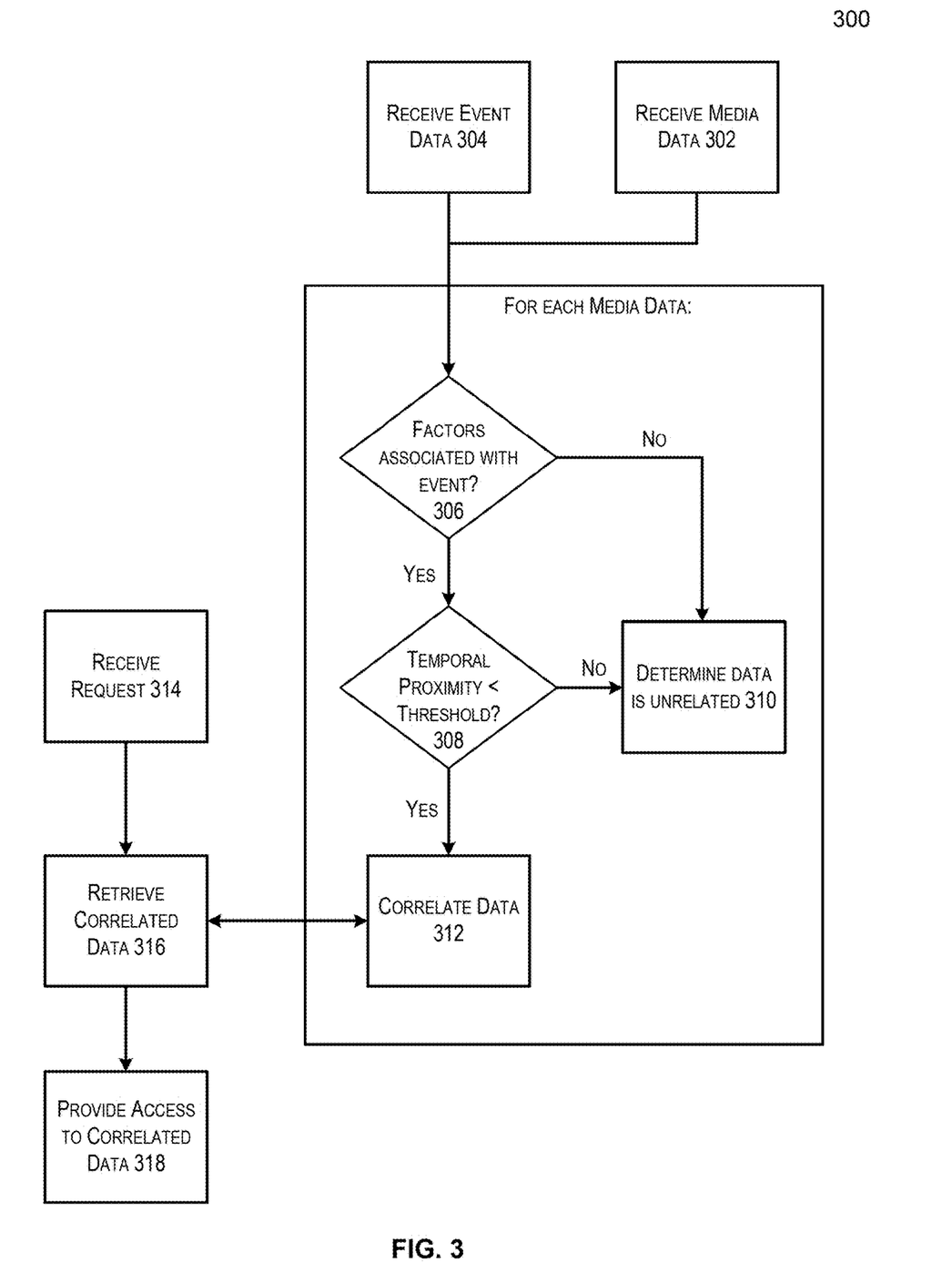
FIG. 3 depicts a block diagram showing an example process flow for correlating media data with events in accordance with some embodiments.

FIG. 3 depicts a block diagram showing an example process flow for correlating media data with events in accordance with embodiments. The process 300 involves interactions between various components of the architecture 100 described with respect to FIG. 1. More particularly, the process 300 involves interactions between at least a request processing platform 102, a CAD system 104, and a data source 106.

At 302 of the process 300, media data is received from one or more data sources external to the request processing platform. Such data sources may include any combination of media capture devices capable of capturing media data. In some embodiments, the media data may be received from the one or more data sources in a continuous stream (e.g., as streaming data). In some embodiments, the media data may be received from the one or more data sources on a periodic basis. In some embodiments, media data may be received from a data source upon demand. For example, the request processing platform may, upon determining that media data from a particular data source might be relevant, may request media data from that data source.

At 304 of the process 300, information related to an event is received from a CAD system. Such information related to an event may be generated upon the CAD system receiving a call from a person requiring emergency assistance. The information about the event may include an indication of a location associated with the event (e.g., a location at which the event occurred), a time or range of times associated with the event, a type or category of the event, or any other suitable information about the event.

Upon receiving information about an event, the request processing platform may compare that information to that of each of the received media data. At 306 of the process 300, a determination may be made as to whether one or more factors attributed to the media content are associated with one or more events. In some embodiments, this may comprises making a determination that a location associated with the information about the event may be compared to the location associated with the received media to determine whether the two locations were within a threshold proximity of distance. In some embodiments, the threshold amount of distance may be determined based on a type or category of the event. In some embodiments, the threshold amount of distance may be determined based on an amount of time between a time associated with the media and a time associated with the event. In some embodiments, one or more object recognition techniques may be used to identify one or more objects depicted within the media data. In these embodiments, the one or more factors may include an a determination as to whether the one or more objects depicted within the media data are associated with an event.

Upon determining that no factors associated with the media data are associated with the event (e.g., "No" from decision block 306), the media data is determined to be unrelated to the event at 310.

At 308 of the process 300, upon determining that one or more factors associate with the media data is also associated with at least one event (e.g., "Yes" from decision block 306), a time or range of times associated with the information about the event may be compared to the time or range of times associated with the received media to determine whether the two times were within a threshold proximity of time. The event may be associated with a time that has occurred either within a threshold amount of time before or after the time associated with the received media. Upon determining that a point in time associated with each of the event and a particular media data is greater than the threshold amount of distance (e.g., "No" from decision block 308), the media data is determined to be unrelated to the event at 310.

At 312 of the process 300, upon determining that a point in time associated with each of the event and a particular media data is greater than the threshold amount of distance (e.g., "Yes" from decision block 308), the media data is determined to be related to the event. A correlation (e.g., a data record indicating the correlation) is then created between the media data determined to be related to the event and the event that is then stored in a database of mapped correlations. Such correlations may be created and stored between the event and a number of media data. In some cases, a data record may comprise a database record stored in a database table. Such a data record may include information associated with one or more of the event or the media data. For example, the data record may include an indication of the criteria used to determine the correlation between the event and the media data.

In some embodiments, one or more additional processes may be performed to determine a relevance of the media data to the event prior to correlating the media data to the event. For example, one or more object recognition techniques may be used to identify various objects depicted within an image or video. In this example, the image or video may be determined to be relevant to the event if an object associated with the event is detected. In some cases, such an object may be a person (e.g., a suspect or an emergency personnel) involved in the event. In some cases, such an object may be a type of vehicle involved in the event. For example, if the event relates to an emergency that involves a red car, then a video or image that is determined to be both temporally and geographically proximate to the event may be determined to be relevant if it includes a depiction of a red car as detected using the object recognition techniques.

At 314 of the process 300, a request may be received for information related to the event. In some embodiments, the request includes an indication of an event identifier or other identification number that can be used to uniquely identify the event. In some embodiments, the request may indicate one or more details of the event that can be used to identify the event. For example, the request may indicate one or more persons involved in the event as well as a time at which the event occurred. In this example, the event may be identified based on this information.

At 316 of the process 300, a set of media data correlated to the identified event may be generated. Such a set of media data may include all media data determined to be related to the event based on proximity in both location and time.

At 318 of the process 300, the set of media data is provided to the entity from which the request was received at 314. In some embodiments, the set of media data is provided directly to the requesting entity as a set of data files. In some embodiments, a link or other location in memory for the set of data is provided to the entity from which the request was received.

Figure 4:
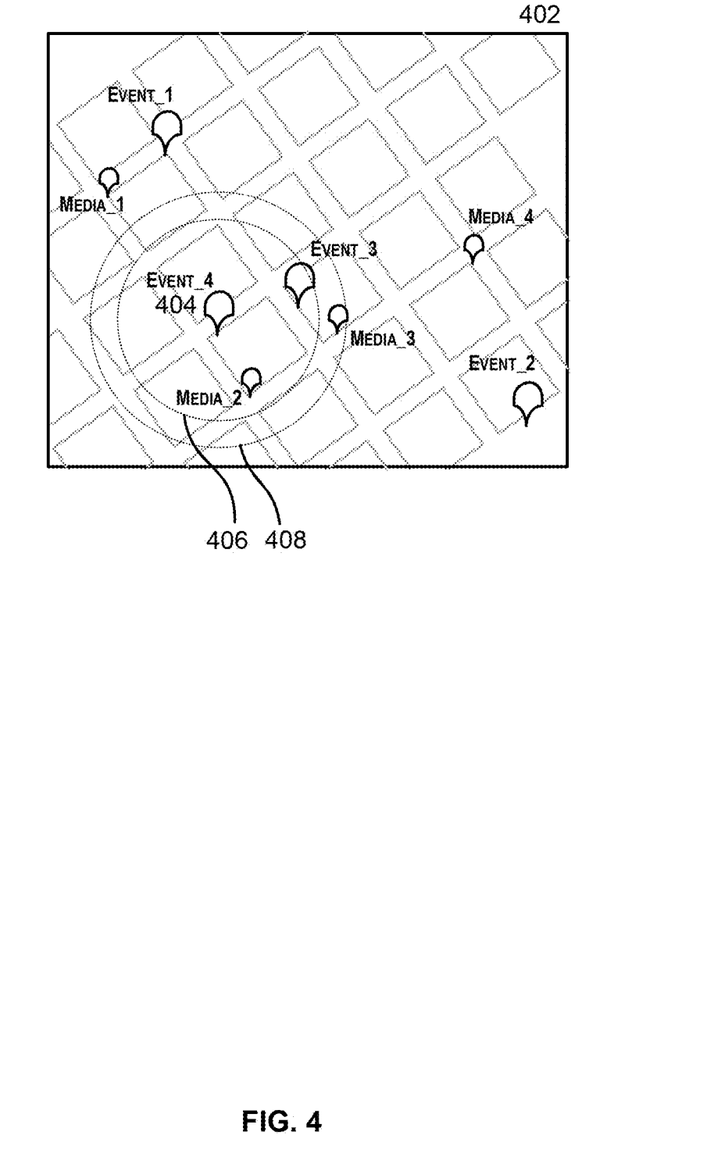
FIG. 4 depicts an example of a process for determining relevance of one or more media to an event based on geographic proximity in accordance with some embodiments.

FIG. 4 depicts an illustrative example of a process for determining relevance of one or more media to an event based on geographic proximity in accordance with some embodiments. As depicted, each of a number of events (e.g., event_1-event_4) may be associated with a geographic location. Additionally, a number of media data (e.g., media_1-media 4) may be received from various data sources, each of those number of media data may also be associated with a location.

In order to identify correlations between a particular media data and an event, a geographic proximity of that media data to the event is determined. This may comprise identifying a geographical distance between a location associated with the media data and a location 404 associated with the event. In some embodiments, such a geographical distance may be a straight-line approximation of a distance between the two respective locations. At least some of these embodiments may utilize one or more geofencing techniques. In some embodiments, such a geographical distance may comprise a shortest possible distance between the two locations that can be traveled via one or traversable paths (e.g., roadways). At least some of these embodiments may utilize one or more route planning techniques. In embodiments that utilize shortest possible path distance, an indication may be stored of a speed limit or other travel speed restriction associated with each portion of the shortest path.

The geographic proximity is then compared against a threshold distance 406. In embodiments in which a threshold distance embodies a straight-line approximation, such a threshold distance 406 may be represented by a circle surrounding a location 404 associated with the event. In some embodiments, the distance threshold may be dynamically determined or there may be multiple distance thresholds. For example, in some cases, a distance threshold may be determined based on a type or category of event or a severity of the event. By way of illustration, consider that an event generated for an emergency that involves an assault may be more severe than an event generated for an emergency that involves a lost or stolen item. As noted above, multiple distance thresholds may be applied to determine a relevance of a media data to an event. In some cases, each of the multiple distance thresholds may be determined based on an amount of time that has elapsed from a time of the event. For example, at a first time $T_1$, a first distance threshold 406 may be applied to determine a relevance of media data to the event. At a second time $T_2$, at a predetermined amount of time after the time $T_1$, a second distance threshold 408 may be applied to determine a relevance of the media data to the event. In this example, the second distance threshold 408 may be greater than or less than the first distance threshold.

By way of illustrating the use of multiple distance thresholds, consider a scenario in which a kidnapping has occurred. In this scenario, an event (e.g., Event_4) may be generated by a CAD system upon a person making a telephone call to emergency services to report the kidnapping. An emergency services dispatcher may then dispatch emergency service personnel (e.g., a police officer) to a location 404 at which the kidnapping has been reported to have occurred. In this example, assume that the kidnapping is reported to have involved a red car.

For the purposes of this scenario, consider that a number of street cameras have been positioned within the public space represented by the map 402 and that each of those street cameras is provided video data (a type of media data) to the request processing system. In this scenario, the system will need to determine a relevance of the video data received from each of the street cameras as well as a portion of that video data that may be relevant.

Continuing with the example scenario provided above, the system may determine that each of the video data originating from street cameras located within the first distance threshold 406 from the location 404 reported for the kidnapping is relevant to the Event_4 at an initial point in time $T_1$ associated with the kidnapping itself. In the depicted example, Media_2 may be determined to be relevant upon determining that it was captured from a street camera located within the distance threshold 406. In some embodiments, one or more other events may be associated with the event. In the depicted example, Event_3 may be determined to be relevant to Event_4 by virtue of being associated with a location within the distance threshold 406.

In addition, the system may determine that video data originating from street cameras located within a second distance threshold 408 from the location 404 at a second point in time $T_2$ occurring a predetermined amount of time after the initial point in time $T_1$. In this case, the video data from a street camera located within the distance threshold 408 (but outside of distance threshold 406) may be determined to be relevant if a red car is determined to be detected within that video data. In the depicted example, Media_3 may be determined to be relevant upon identifying an image of a red car within that video data (e.g., using one or more object recognition techniques).

Figure 5:
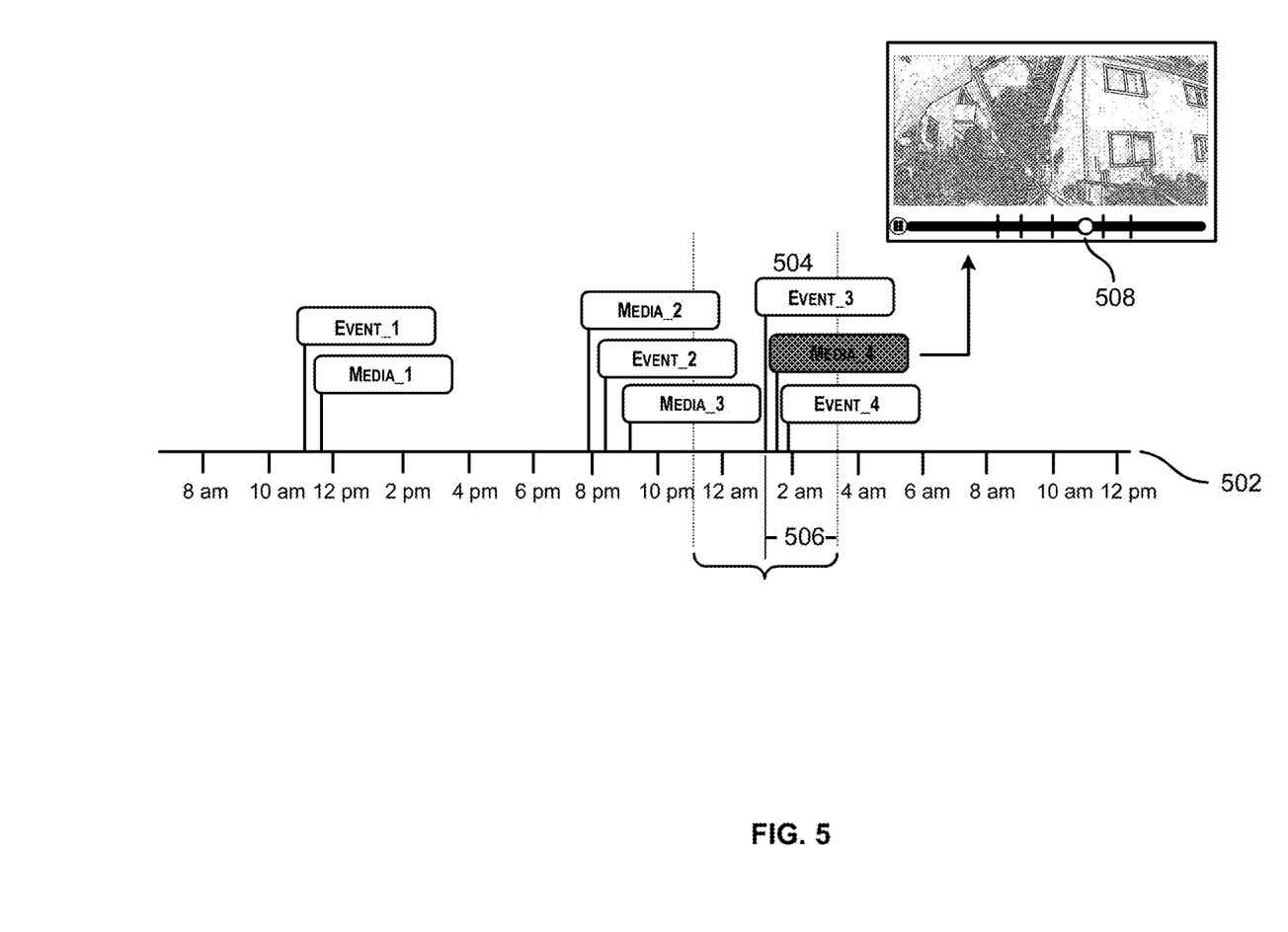
FIG. 5 depicts an example of a process for determining relevance of one or more media to an event based on temporal proximity in accordance with some embodiments.

FIG. 5 depicts a first illustrative example of a process for determining relevance of one or more media to an event based on temporal proximity in accordance with some embodiments. As depicted, each of a number of events (e.g., event_1-event_4) may be associated with a point in time on a timeline 502. Additionally, a number of media data (e.g., media_1-media 4) received from various data sources may each be similarly associated with a point in time on the timeline 502.

Once a potential relevance based geographical proximity is determined, in order to identify correlations between a particular media data and an event 504 (e.g., Event_3), a temporal proximity of that media data to the event is determined. This may comprise identifying a temporal proximity between a point in time associated with the media data and a point in time associated with the event. A temporal proximity may comprise a difference in time between the point in time associated with the media data and a point in time associated with the event.

The determined temporal proximity is then compared against a threshold temporal distance 506. In this example, the media data (e.g., Media_4) may be determined to be relevant to the event (e.g., Event_3) based on the determined temporal proximity being less than the threshold temporal distance 506.

As discussed elsewhere, the Media_4 may be a video file. In some embodiments, such a video file may be viewed using a media player application. In some cases, a point in time 508 or a range of times within the video file may be determined to be relevant to the event.

Figure 6:
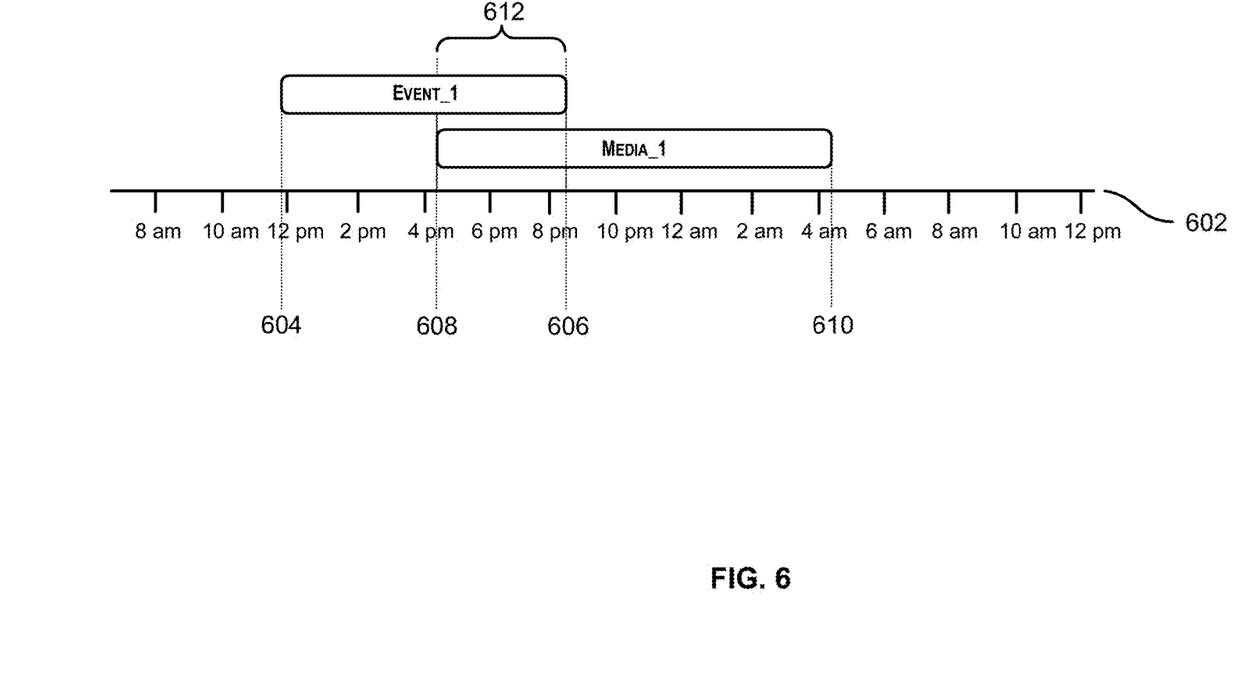
FIG. 6 depicts another example of a process for determining relevance of one or more media to an event based on temporal proximity in accordance with some embodiments.

FIG. 6 depicts a second illustrative example of a process for determining relevance of one or more media to an event based on temporal proximity in accordance with some embodiments. As depicted, in some embodiments, an event (e.g., Event_1) may be associated with a range of times on a timeline 602. In these embodiments, the event may be associated with both a beginning point in time 604 and an ending point in time 606.

Additionally, a media data (e.g., Media_1) received from a data source may be similarly associated with a range of times on the timeline 602, in that the media may be associated with both a beginning point in time 608 and an ending point in time 610. In some embodiments, a portion 612 of the media data may be determined to be relevant to the event. In some embodiments, the portion 612 of the media data may be determined based on its overlap in time with the event. More particularly, the portion of the media data determined to be relevant to the event may be a portion that is bounded by the beginning and end times of the event and/or the media file itself. In the depicted example, the portion 612 of the media file determined to be relevant to the event may be determined based on boundaries that correspond to the beginning time 608 of the media data and an ending time 606 associated with the event.

Figure 7:
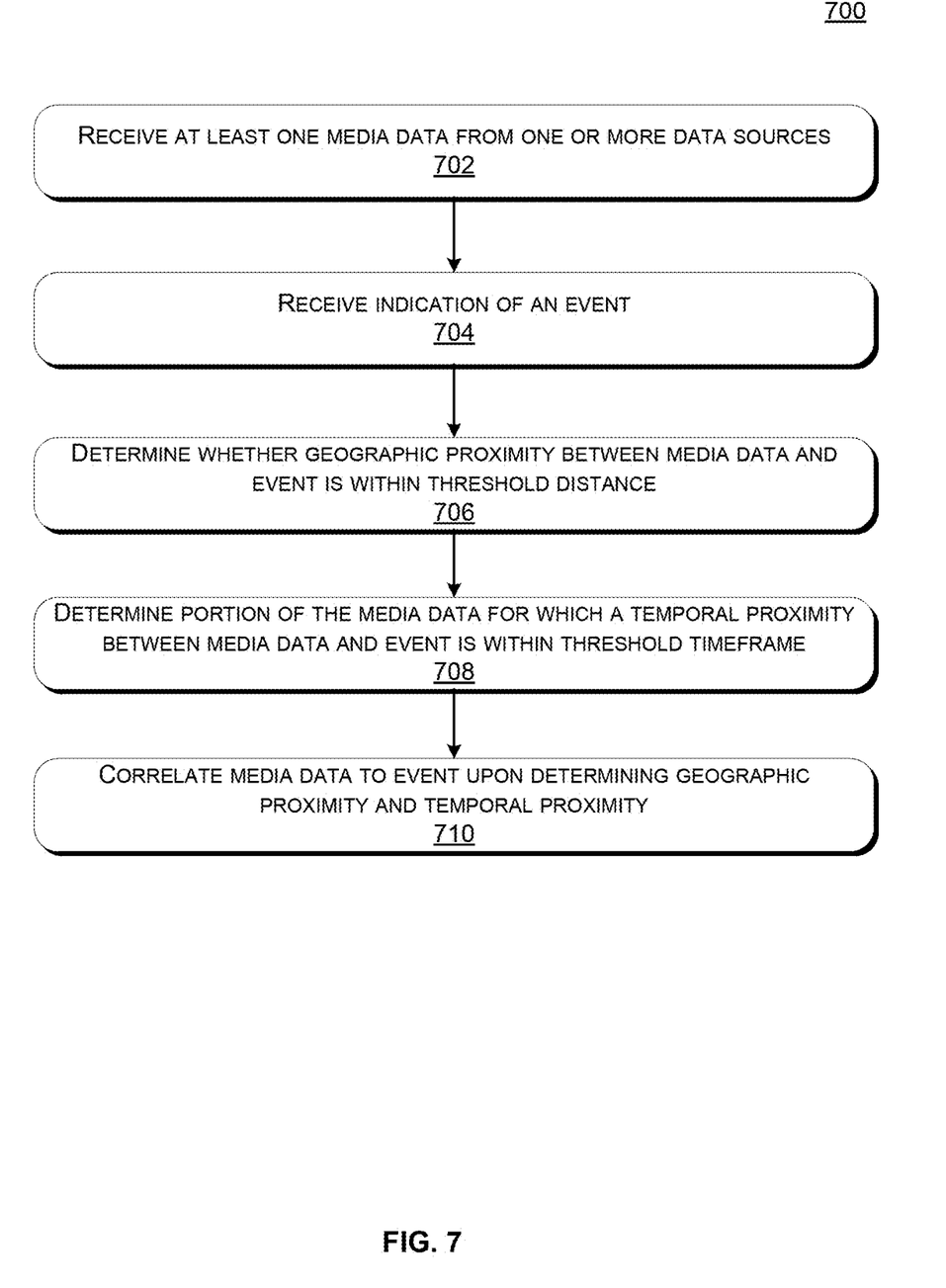
FIG. 7 depicts a block diagram showing an example process flow for automatically correlating a portion of a media data to an event in accordance with embodiments.

FIG. 7 depicts a block diagram showing an example process flow for automatically correlating a portion of a media data to an event in accordance with embodiments. The process 700 may be performed by components within a system 100 as discussed with respect to FIG. 1 above. For example, the process 700 may be performed by a request processing platform 102 in communication with a CAD system 104, a number of data sources 106, and one or more third-party devices 108.

At 702, the process 700 comprises receiving at least one media data from one or more data sources. In some embodiments, the at least one media data comprises at least one of an audio data, video data, or image data. In some embodiments, the one or more data sources comprises at least one of a vehicle-mounted camera, a body-mounted camera, or private security network camera. In some embodiments, the at least one media data is received in real time as streaming data.

At 704, the process 700 comprises receiving an indication of an event. In some embodiments, the event is related to a request for emergency services. For example, the event may be associated with a request for emergency services that is received via a computer-aided dispatch system.

At 706, the process 700 comprises determining whether geographic proximity between the media data and the event is within a threshold distance. In some embodiments, the threshold distance is determined based on an amount of time elapsed between the first time and the second time. In some embodiments, the threshold distance is determined based on a type or category associated with the event.

At 708, the process 700 comprises determining a portion of the at least one media data for which a temporal proximity between the media data and the event is within a predetermined threshold timeframe. In some embodiments, a first point in time is associated with the event and a second point in time is associated with the at least one media data. In these embodiments, determining the portion of the at least one media data for which the temporal proximity is within the threshold timeframe comprises determining that an amount of time between the first point in time and the second point in time is less than the threshold timeframe. In some embodiments, the media data is associated with a first time range and the event is associated with a second time range. In these embodiments, determining the portion of the at least one media data for which the temporal proximity is within a threshold timeframe comprises determining an overlap between the first time range and the second time range.

At 710, the process 700 comprises correlating media data to the event upon determining a geographical and temporal proximity of the media data to the event. In some embodiments, the process may comprise identifying at least one second media data based on the at least one second media data being associated with a resource also associated with the event, and creating a correlation between the at least one second media data and the event.

In some embodiments, the process 700 further comprises receiving a request for information about the event, generating a set of media data based at least in part on the created correlation, and providing the set of media in response to the request. In some embodiments, providing the set of media in response to the request comprises providing a set of data files for download. In some embodiments, providing the set of media in response to the request comprises providing a link to a location in memory of the set of media.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:
1. A method comprising:
receiving, from one or more data sources configured to provide streaming media data, at least one streaming media data associated with a first location, the at least one streaming media data comprising at least one of an audio data, video data, or image data;
receiving an indication of an event, the event associated with a time for an occurrence of the event and a second location;
determining an amount of time that has elapsed since the time for the occurrence of the event;
determining whether a geographic proximity between the first location associated with the at least one streaming media data and the second location associated with the event is within a threshold distance, wherein the threshold distance increases or decreases based on the amount of time that has elapsed since the time of the occurrence of the event such that the threshold distance is a first threshold distance when the amount of time that has elapsed equals a first predetermined amount of time and is a second threshold distance when the amount of time that has elapsed equals a second predetermined amount of time, in which the second predetermined amount of time is longer than the first predetermined amount of time;
upon determining the geographic proximity is within the threshold distance, determining a portion of the at least one streaming media data for which a temporal proximity is within a threshold timeframe, the portion of the at least one streaming media data spanning a length between a beginning and end time within the streaming media data; and
upon determining the portion of the at least one streaming media data for which the temporal proximity is within the threshold timeframe, creating a data record indicating a correlation between the portion of the at least one streaming media data and the event.

2. The method of claim 1, further comprising:
receiving a request for information about the event;
generating a set of media data that includes at least the portion of the at least one streaming media data based at least in part on the created correlation; and
providing the set of media data in response to the request.

3. The method of claim 2, wherein providing the set of media data in response to the request comprises providing a set of data files for download.

4. The method of claim 2, wherein providing the set of media data in response to the request comprises providing a link to a location in memory of the set of media.

5. The method of claim 1, wherein the one or more data sources comprises at least one of a vehicle-mounted camera, a body-mounted camera, or private security network camera.

6. The method of claim 1, wherein the event relates to a request for emergency services.

7. The method of claim 6, wherein the request for emergency services is received via a computer-aided dispatch system.

8. A computing device comprising:
a processor; and
a memory including instructions that, when executed with the processor, cause the computing device to, at least:
receive, from one or more data sources configured to provide streaming media data, at least one streaming media data associated with and a first location, the at least one streaming media data comprising at least one of an audio data, video data, or image data;
receive an indication of an event, the event associated with a time for an occurrence of the event and a second location;
determine an amount of time that has elapsed since the time for the occurrence of the event;
determine whether a geographic proximity between the first location associated with the at least one streaming media and the second location associated with the event is within a threshold distance, wherein the threshold distance increases or decreases based on the amount of time that has elapsed since the time of the occurrence of the event such that the threshold distance is a first threshold distance when the amount of time that has elapsed equals a first predetermined amount of time and is a second threshold distance when the amount of time that has elapsed equals a second predetermined amount of time, in which the second predetermined amount of time is longer than the first predetermined amount of time;

upon determining the geographic proximity is within the threshold distance, determine a portion of the at least one streaming media data for which a temporal proximity is within a threshold timeframe, the portion of the at least one streaming media data spanning a length between a beginning and end time within the streaming media data; and upon determining the portion of the at least one streaming media data for which the temporal proximity is within the threshold timeframe, create a data record indicating a correlation between the portion of the at least one streaming media data and the event.

9. The computing device of claim 8, wherein the second threshold distance is greater than or less than the first threshold distance.

10. The computing device of claim 8, wherein the instructions further cause the computing device to:
identify at least one second media data based on the at least one second media data being associated with a resource also associated with the event; and
create a correlation between the at least one second media data and the event.

11. The computing device of claim 8, wherein a first point in time is associated with the event and a second point in time is associated with the at least one streaming media data and determining the portion of the at least one streaming media data for which the temporal proximity is within the threshold timeframe comprises determining that an amount of time between the first point in time and the second point in time is less than the threshold timeframe.

12. The computing device of claim 8, wherein the media data is associated with a first time range and the event is associated with a second time range and determining the portion of the at least streaming one media data for which the temporal proximity is within a threshold timeframe comprises determining an overlap between the first time range and the second time range.

13. The computing device of claim 8, wherein the at least one streaming media data is received in real time as streaming data.

14. A non-transitory computer-readable media collectively storing computer-executable instructions that upon execution cause one or more computing devices to collectively perform acts comprising:
receiving, from one or more data sources configured to provide streaming media data, at least one streaming media data associated with a first location, the at least one streaming media data comprising at least one of an audio data, video data, or image data;
determining a first set of factors associated with at least a portion of the streaming media data;
receiving an indication of an event, the event associated with a second set of factors, the second set of factors including an amount of time that has elapsed since a time of an occurrence the event;
identifying, a correlation between the portion of the streaming media data and the event based on one or more factors of the first set of factors and the second set of factors, the identifying includes determining whether a geographic proximity between a first location that is associated with the streaming media data and a second location associated with the event is within a threshold distance,
wherein the threshold distance increases or decreases based on the amount of time that has elapsed since the time of the occurrence of the event such that the threshold distance is a first threshold distance when the amount of time that has elapsed equals a first predetermined amount of time and is a second threshold distance when the amount of time that has elapsed equals a second predetermined amount of time, in which the second predetermined amount of time is longer than the first predetermined amount of time; and
upon determining the portion of the at least one streaming media data for which the correlation with the event has been identified based at least on the geographic proximity being within the threshold distance, creating a data record indicating a correlation between the portion of the at least one streaming media data and the event.

15. The non-transitory computer-readable media of claim 14, wherein the one or more factors comprise an identification of an object within the portion of the media data, the object associated with the event.

16. The non-transitory computer-readable media of claim 14, wherein the one or more data sources comprise at least one of a vehicle-mounted camera, a body-mounted camera, or private security network camera.

17. The non-transitory computer-readable media of claim 14, wherein the second threshold distance is greater than or less than the first threshold distance.

* * * * *